(12) United States Patent
Woo et al.

(10) Patent No.: US 7,583,633 B2
(45) Date of Patent: Sep. 1, 2009

(54) HARD HANDOFF TARGET GENERATION IN A MULTI-FREQUENCY CDMA MOBILE NETWORK

(75) Inventors: Hsien Woo, San Diego, CA (US); Felicia Tsui, San Diego, CA (US); Viswanath Nagarajan, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1253 days.

(21) Appl. No.: 10/375,989

(22) Filed: Feb. 28, 2003

(65) Prior Publication Data

US 2004/0170136 A1    Sep. 2, 2004

(51) Int. Cl.
*H04Q 7/00*    (2006.01)
(52) U.S. Cl. ........................ 370/331; 370/320
(58) Field of Classification Search .............. 370/310.2, 370/320, 328, 331, 332, 335, 338, 342, 349, 370/310, 329, 341, 333
See application file for complete search history.

(56) References Cited

U.S. PATENT DOCUMENTS

| | | | | |
|---|---|---|---|---|
| 5,697,055 A | * | 12/1997 | Gilhousen et al. | 455/436 |
| 5,828,661 A | * | 10/1998 | Weaver et al. | 370/331 |
| 5,848,063 A | * | 12/1998 | Weaver et al. | 370/331 |
| 5,917,811 A | * | 6/1999 | Weaver et al. | 370/332 |
| 5,937,019 A | * | 8/1999 | Padovani | 375/358 |
| 5,940,761 A | * | 8/1999 | Tiedemann et al. | 455/437 |
| 5,946,621 A | * | 8/1999 | Chheda et al. | 455/440 |
| 5,982,758 A | | 11/1999 | Hamdy | |
| 5,987,012 A | | 11/1999 | Bruckert et al. | |
| 6,026,301 A | * | 2/2000 | Satarasinghe | 455/436 |
| 6,075,989 A | * | 6/2000 | Moore et al. | 455/436 |
| 6,075,990 A | * | 6/2000 | Shin | 455/440 |
| 6,456,606 B1 | | 9/2002 | Terasawa | |
| 6,564,057 B1 | * | 5/2003 | Chun et al. | 455/437 |
| 6,590,879 B1 | * | 7/2003 | Huang et al. | 370/331 |
| 6,687,237 B1 | * | 2/2004 | Lee et al. | 370/331 |
| 6,711,408 B1 | * | 3/2004 | Raith | 455/440 |
| 6,826,161 B1 | * | 11/2004 | Shahidi et al. | 370/331 |
| 6,845,238 B1 | | 1/2005 | Muller | |

(Continued)

FOREIGN PATENT DOCUMENTS

CN    1186403    7/1998

(Continued)

*Primary Examiner*—Brenda Pham
(74) *Attorney, Agent, or Firm*—Coats & Bennett, P.L.L.C.

(57) ABSTRACT

A CDMA network dynamically generates hard handoff (HHO) target sets to support mobile station HHO. Dynamically identifying CDMA channels or cells as targets for HHO eliminates the need for statically configured HHO target sets. In an exemplary embodiment, a source BSS identifies a first set of channels corresponding to common neighbor cells of the cells associated with the active set pilots and/or reported PBU pilots. This first set may be adjusted by removing any common neighbor cells that include soft handoff target channels, and by adding selected vertical neighbor channels of the active set pilots and/or reported PBU pilots. Channels in the first set may be grouped by carrier frequency and evaluated based on CDMA channel type, BSS affiliation and characteristics, and the target's relationship to the active set to identify a preferred HHO target set. Such operations permit dynamic determination of whether to perform inter- or intra-BSS HHO.

51 Claims, 8 Drawing Sheets

U.S. PATENT DOCUMENTS

| | | |
|---|---|---|
| 6,980,805 B2 * | 12/2005 | Matsumoto et al. ......... 455/440 |
| 7,400,603 B1 | 7/2008 | Wakizaka |
| 2002/0067707 A1 | 6/2002 | Morales et al. |
| 2002/0071403 A1 | 6/2002 | Ren et al. |
| 2004/0092259 A1 | 5/2004 | Blanc et al. |
| 2004/0125768 A1 * | 7/2004 | Yoon et al. .................. 370/331 |

FOREIGN PATENT DOCUMENTS

| | | |
|---|---|---|
| CN | 1399855 | 2/2003 |
| EP | 1 154 659 | 11/2001 |
| JP | 2000511376 | 8/2000 |
| JP | 2001036939 | 2/2001 |
| JP | 2004522348 | 7/2004 |
| WO | WO 01/20942 | 3/2001 |
| WO | WO 01/99291 | 12/2001 |
| WO | WO 02/054819 | 7/2002 |
| WO | WO 03/005759 | 1/2003 |

* cited by examiner

| | INTRA-BSS HHO | INTER-BSS HHO |
|---|---|---|
| $P_1$ | [VERTICAL NEIGHBOR(TRIG) <> BORDER] AND [AT LEAST ONE STANDARD VERTICAL NEIGHBOR] | |
| $P_2$ | | [DIFFERENT SYSTEM INDICATION == TRUE] (i.e EITHER [1] THERE IS SOME INCOMPATIBILITY BETWEEN THE SOURCE BSS SYSTEM AND AT LEAST ONE FOREIGN BSS SYSTEM OR [2] CDMA FREQUENCY ASSIGNMENT INFORMATION OF AT LEAST ONE OF THE FOREIGN BSS CELL IS UNAVAILABLE OR [3] NO VERTICAL NEIGHBORS AND ALL COMMON NEIGHBORS BELONG TO FOREIGN BSS) |
| $P_3$ | [AT LEAST ONE STANDARD COMMON NEIGHBOR] AND [ZERO VERTICAL NEIGHBORS] | |
| $P_4$ | [AT LEAST ONE BORDER VERTICAL NEIGHBOR] AND [AT LEAST ONE STANDARD COMMON NEIGHBOR/ VERTICAL NEIGHBOR] | |
| $P_5$ | | [ALL VERTICAL NEIGHBORS ARE BORDERS] AND [AT LEAST ONE FOREIGN COMMON NEIGHBOR] |
| $P_6$ | ALL OTHER CASES | |

DECREASING PREFERENCE →

*FIG. 7*

HARD HANDOFF TARGET GENERATION IN A MULTI-FREQUENCY CDMA MOBILE NETWORK

BACKGROUND OF THE INVENTION

The present invention generally relates to hard handoff in a multi-frequency CDMA network and particularly relates to dynamic generation of hard handoff targets.

Mobile communication networks, e.g., cellular networks, generally comprise a plurality of defined service areas referred to as cells. In networks based on Code Division Multiple Access (CDMA) techniques, each cell uses at least one CDMA channel, which represents the collection of forward and reverse radio links supporting communication between mobile stations in that cell and the network at a given carrier frequency. In this sense, each CDMA channel may be regarded as the intersection of a particular carrier frequency and a particular service area or cell. Where multiple carrier frequencies are used within one cell, that cell offers a like multiple of CDMA channels, each one operating in a different carrier frequency. More particularly, it should be understood that a typical CDMA channel is based on a defined forward link and reverse link frequency pair.

When a mobile station is admitted for service, it is assigned radio link resources on at least one CDMA channel at a particular carrier frequency, e.g., the mobile station is assigned to a particular forward/reverse link frequency pair. If that mobile station moves among cells while its connection is active, the network assigns needed radio link resources on the CDMA channel(s) associated with its new service location. The practice of transitioning radio service from one CDMA channel to another is referred to as "hand off."

CDMA networks offer an opportunity to improve service reliability during handoff by exploiting "soft handoff" wherein the mobile station is simultaneously served by two or more CDMA channels. Soft handoff is referred to as a make-before-break handoff because, from the mobile station's perspective, forward link service begins on the new CDMA channel(s) before it ends on the mobile station's current CDMA channel(s). Indeed, the mobile station's geographic location may be such that it is served simultaneously by three or more CDMA channels. Of course, the benefits of soft handoff must be balanced against the consumption of system resources, since the mobile station must be allocated radio link resources on each CDMA channel used to serve it in soft handoff.

Soft handoff is not always desirable, or even possible. For example, the mobile station may move to a new cell that does not offer a CDMA channel on its current carrier frequency. As an example, assume that the mobile station is in Cell A operating on a CDMA channel in frequency F2, with this channel denoted as F2A, designating the CDMA channel corresponding to F2 in Cell A. Further, assume that the mobile station begins moving toward Cell B, which operates only with carrier frequency F1, i.e., the only CDMA channel available in Cell B is F1B.

Since the mobile station operates only on one carrier frequency at a time, it cannot be served by both F2A and F1B, and thus must undergo a "hard handoff" rather than a soft handoff. Hard handoffs generally are break-before-make handoffs arising from, as in the above example, a hard frequency handoff. Hard handoffs also are required where the control of a call is transitioning from one Base Station System (BSS) to another BSS. Indeed, the types of hard handoff include intra-BSS and inter-BSS, with the latter case being either an intra-MSC (same MSC) or inter-MSC (different MSCs) type of hard handoff.

Within these broad hard handoff types, there are two typical hard handoff triggering mechanisms. A first mechanism is based on Round-Trip-Delay (RTD), which is a measure of round-trip signal delay between a particular mobile station and a particular RBS. Since this delay time is directly proportional to distance, the RTD value may be used to sense when the mobile has moved so far from the serving RBS in a current cell that handoff to another cell is appropriate.

A second common triggering mechanism for hard handoffs involves Pilot Beacon Units (PBUs), which are special pilot signal transmitters that identify special border cells marking the transition between systems. As mobile stations report observed pilot signal strengths, the Base Station Controller (BSC) in the mobile station's current BSS can recognize the presence of a PBU channel pilot within a Pilot Strength Measurement Message (PSMM) from the mobile station. Thus, the current BSC recognizes when the mobile station is moving toward cells associated with another system by the presence of one or more PBU pilots in pilot signal reports from the mobile station.

Regardless of the triggering mechanism, hard handoffs in a conventional network rely on the use of pre-configured handoff targets. With this approach, each cell in the network has defined handoff targets that are specified, for example, as part of network provisioning operation. Significant maintenance overhead thus arises as the handoff target information must be maintained, updated, and its consistency verified, as the network changes, such as when cells are added and/or modified.

Among these configuration choices, system operators would have to pre-configure the type of hard handoff to be performed for a given CDMA channel (inter-BSS, intra-BSS), and would have to explicitly configure all of the potentially available target frequencies and cells available. Because of the static nature of these hard handoff configurations, such networks lose the advantage gained through dynamic knowledge of current radio frequency (RF) conditions, CDMA channel availability, etc. As a consequence, statically configured hard handoff types and targets often are too optimistic, leading to failed handoff and interrupted service, or are too pessimistic, leading to inefficient usage of network resources.

Thus, what is needed is a hard handoff method that dynamically determines one or more targets for the hard handoff of a mobile station. Preferably, this dynamic approach considers radio conditions and resource availability, and avoids the need for extensive, statically configured hard handoff target information.

SUMMARY OF THE INVENTION

The present invention comprises a method and apparatus to dynamically generate hard handoff target information to support hard handoff (HHO) of a mobile station in a wireless network. Dynamically generated target information may identify one or more target CDMA channels, or may identify one or more cells from which CDMA channels should be selected based on, for example, resource availability. Regardless, in an exemplary embodiment, dynamic target set generation is based on the mobile station's active set, and may be further based on additional parameters, such as CDMA channel status, and target set size limits that control the maximum number of CDMA target channels to be used, which may be configured on a per CDMA channel basis to maintain a desired balance between HHO reliability and network capacity utilization efficiency.

In one or more exemplary embodiments, a source Base Station Controller (BSC) dynamically generates a HHO target set of CDMA channels or cells to support HHO of a particular mobile station. For intra-Base Station System (BSS) HHO, the BSC may generate two HHO target sets: a first, most preferred target set, and a second, less preferred target set. These two target sets may include CDMA channels of different frequencies. Regardless, the exemplary BSC may use both target sets to perform an optimal radio link resource allocation, or may use the second target set if it determines that sufficient resources are not available from the first, more preferred target set.

Turning to dynamic target generation details, exemplary dynamic target generation comprises identifying "common neighbor" cells based on manipulating neighbor list information associated with cells corresponding to those pilots identified in the mobile station's active set and, for PBU-based HHO triggers, further includes considering neighbor list information for all PBU pilots as reported by the mobile station in a Pilot Strength Measurement Message (PSMM), for example. Regardless, a first set of CDMA channels is identified based on processing the neighbor list information and, optionally, based on adding "vertical neighbor" channels, if any. For RTD-based HHO triggers, the vertical neighbors of interest are the CDMA channels, if any, in the same cells as the triggering active set pilots but at other than the mobile station's current frequency assignment. For PBU-based HHO triggers, the vertical neighbors are non-PBU vertical neighbors of one or more of any PBU pilots reported by the mobile station and/or the vertical neighbors of the active set pilots.

Once the first set of CDMA channels is identified, such channels may be evaluated for actual selection of target channels according to an exemplary embodiment of the present invention. Such evaluation may be based on, for example, grouping such channels into subsets according to CDMA carrier frequency. Thus, in a multi-carrier CDMA network, there would be as many subsets as there were different carrier frequencies represented by the first set of channels. Subsets may be evaluated to determine a relative preference between them. In one embodiment, the subsets are categorized based on one or more channel parameters associated with the channel(s) in each subset. According to this exemplary method, each subset is evaluated based on determining the channel type, e.g., standard-type or border-type channel, and system affiliation, e.g., same or foreign system, for each channel in the subset. Additional parameters may be considered, such as the number of vertical neighbors within a subset, and the system compatibility of individual channels relative to the current service parameters of the mobile station.

In general, standard channels are more preferred than border channels, vertical neighbor channels are more preferred than non-vertical neighbor channels, and same-system channels are more preferred than foreign-system channels. Thus, evaluation of the frequency subsets may be structured to select CDMA channel targets such that intra-BSS HHO is preferred over inter-BSS HHO, but such preferences may be based on additional, more complex considerations. For example, if a first subset of channels would permit an intra-BSS HHO while a second subset would require inter-BSS HHO, the second subset might still be selected for use in generating the target set if some or all of the channels in the first subset are border-type channels.

Other bases for preferring one subset to another subset includes consideration of the mix of vertical neighbor CDMA channels and common neighbor CDMA channels within the subset. Thus, with all other parameters alike, the inventive method in one or more exemplary embodiments gives greater preference to subsets with greater numbers of vertical neighbors in them. Such preference is better understood by recalling that vertical neighbors in a particular cell are defined as CDMA channels in the same cell but operating on different carrier frequencies.

Additionally, the actual target set generation might be based on fewer than all channels within the selected subset of channels. For example, the network might define target set size limits on a per CDMA channel basis. Thus, the stored set size limit for the CDMA channel corresponding to the triggering pilot in the active set of the mobile station, for example, might be used to reduce the number of CDMA channels to be used as HHO target channels. Using such per-channel target set size limits allows the network to strike a balance between HHO reliability, which is enhanced by targeting a greater number of channels for HHO, and capacity utilization efficiency, which is reduced by using a greater number of channels for HHO. With this approach, one might limit the number of channels in the dynamically generated target set to a relatively small number for CDMA channels in heavily loaded urban areas, and might define larger set size limits for CDMA channels in less heavily loaded rural or outlying areas.

Thus, according to the above details, a source BSC may dynamically generate the HHO target set as a set of particularly identified channels intended for inter- or intra-BSS HHO of the mobile station, or may generate the HHO target set as particularly identified cells. This latter embodiment of target set generation may be useful in inter-BSS HHO, where the source BSC is unable to determine the suitability of particular channels in the target system, and thus may simply identify target cells to the target system. In response, the target BSC would identify the particular channels to be used and report the cell IDs and target frequency back to the source BSC for reporting to the mobile station.

In general, then, the present invention provides dynamic target generation for mobile station hard handoff, which avoids the need for provisioning the network with complex, statically configured HHO target information. In an exemplary embodiment, the BSC within each BSS is programmed or otherwise provisioned with computer instructions embodying the methods of the present invention, such that an exemplary "source" BSC dynamically generates the HHO target set information in accordance with one or more of the above exemplary embodiments for a mobile station supported by it. That is, an exemplary BSC includes processing and control circuits that are configured to dynamically generate a HHO target set for a particular mobile station supported by the BSC in response to HHO trigger for that mobile station.

Where inter-BSS HHO is required (or preferred), the dynamically generated target information may be provided by the generating entity (e.g., the source BSC) for use by the assigning entity (e.g., a target BSC) for final target selection in accordance with current resource availabilities. Those skilled in the art will appreciate further details and advantages of the present invention upon reading the following detailed description, which provides information on one or more exemplary embodiments of the present invention.

BRIEF DESCRIPTION OF THE DRAWINGS

FIG. 7 is an exemplary diagram of HHO type determination.

DETAILED DESCRIPTION OF THE INVENTION

Figure 1:
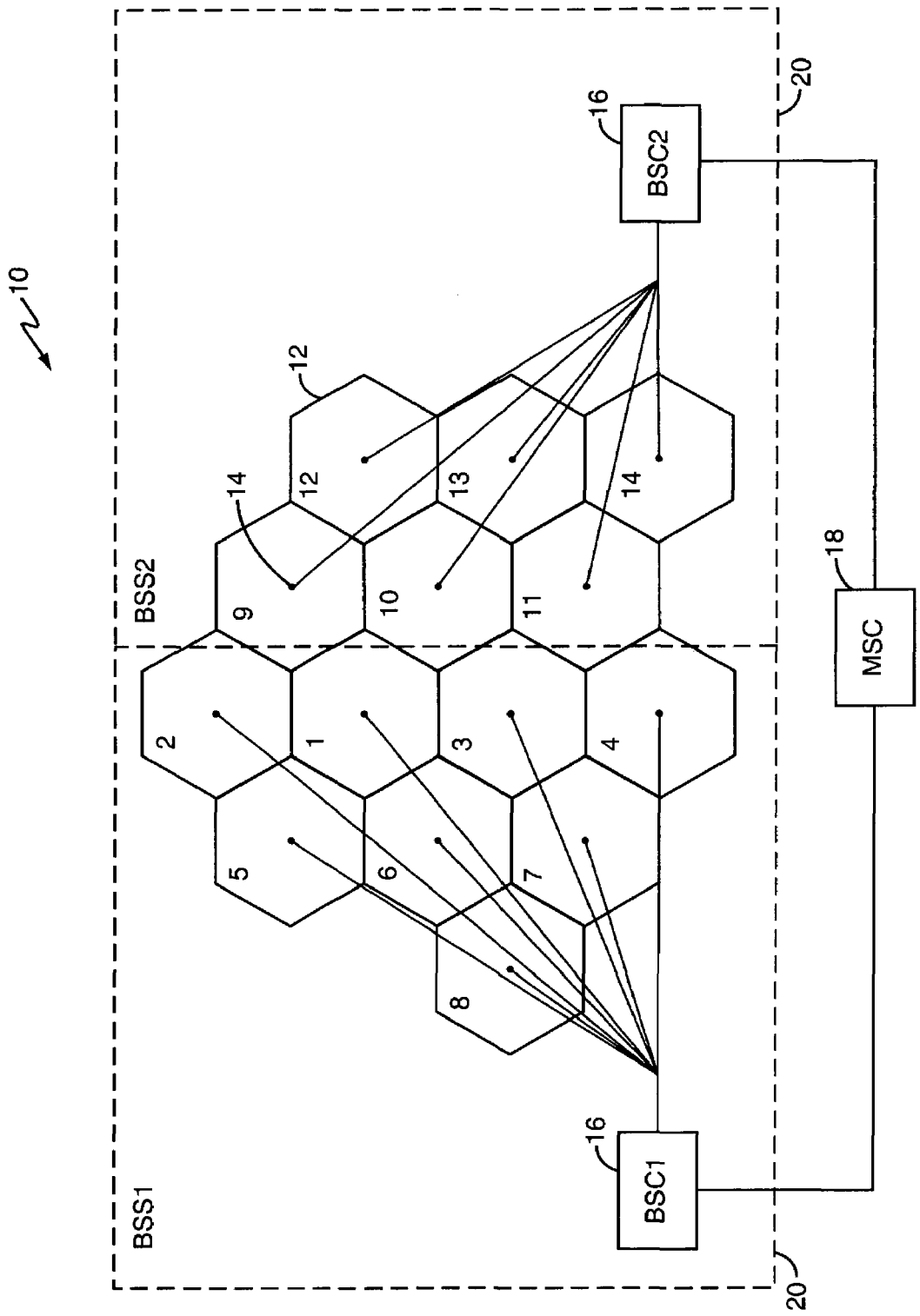
FIG. 1 is a diagram of an exemplary CDMA network employing multiple carrier frequencies.

FIG. 1 illustrates an exemplary, albeit simplified, CDMA network 10 for supporting wireless communication, such as an IS-2000 based CDMA network (cdma2000) or a Wideband CDMA (WCDMA) network. Network 10 provides radio coverage in a plurality of defined service areas, referred to as cells 12 herein, and includes Radio Base Stations (RBSs) 14 and associated Base Station Controllers (BSCs) 16 to support such radio coverage. Network 10 additionally includes one or more Mobile Switching Centers (MSCs) 18, or some other network entity to coordinate call setup/teardown and handoff between BSSs 20, each comprising a BSC 16 and one or more associated RBSs 14 operating under control of the BSC 16.

Of course, those skilled in the art will appreciate that network 10 might actually include many other network entities, or collections of entities, that are not illustrated. Such entities might include a Packet Switched Core Network (PSCN), including one or more Packet Data Serving Nodes (PDSNs) to communicatively couple the BSCs 16 with Public Data Networks such as the Internet. Of further note, those skilled in the art will appreciate that actual implementations of network 10 might include multiple MSCs 18, and that different BSCs 16 might be associated with different MSCs 18, and further will appreciate that the RBS-per-cell relationship illustrated may be varied as needed or desired. Indeed, oftentimes a single RBS 14 provides service for two or more cells 12 but the illustrated relationship of one RBS-per-cell provides a simpler basis for illustration and discussion.

With regard to the illustration, one sees that BSC1 controls RBSs 14 providing radio coverage over a plurality of cells 12 (Cells 1-8), while BSC2 controls RBSs 14 providing radio coverage over another plurality of cells 12 (Cells 9-14). Those skilled in the art should note that the illustrated arrangement and number of cells 12 controlled by each BSC 16 carries no special significance, and simply provides a basis for discussion. All details regarding the layout of cells 12, RBSs 14, BSCs 16, and so on, may be altered as needed or desired without departing from the scope of the present invention.

Regardless, continuing with the illustrated layout, one sees that Cells 1-4 in BSS1 would include "border" type CDMA channels in that these cells abut Cells 9-11 of the neighboring BSS2. In contrast, Cells 5-8 of BSS1, or Cells 12-14 of BSS2 would include "standard" type CDMA channels, assuming that each cell 12 in each of these cell groups only abuts other cells 12 within the same BSS 20. However, even such standard channels may differ in terms of CDMA carrier frequencies, etc.

Figure 2:
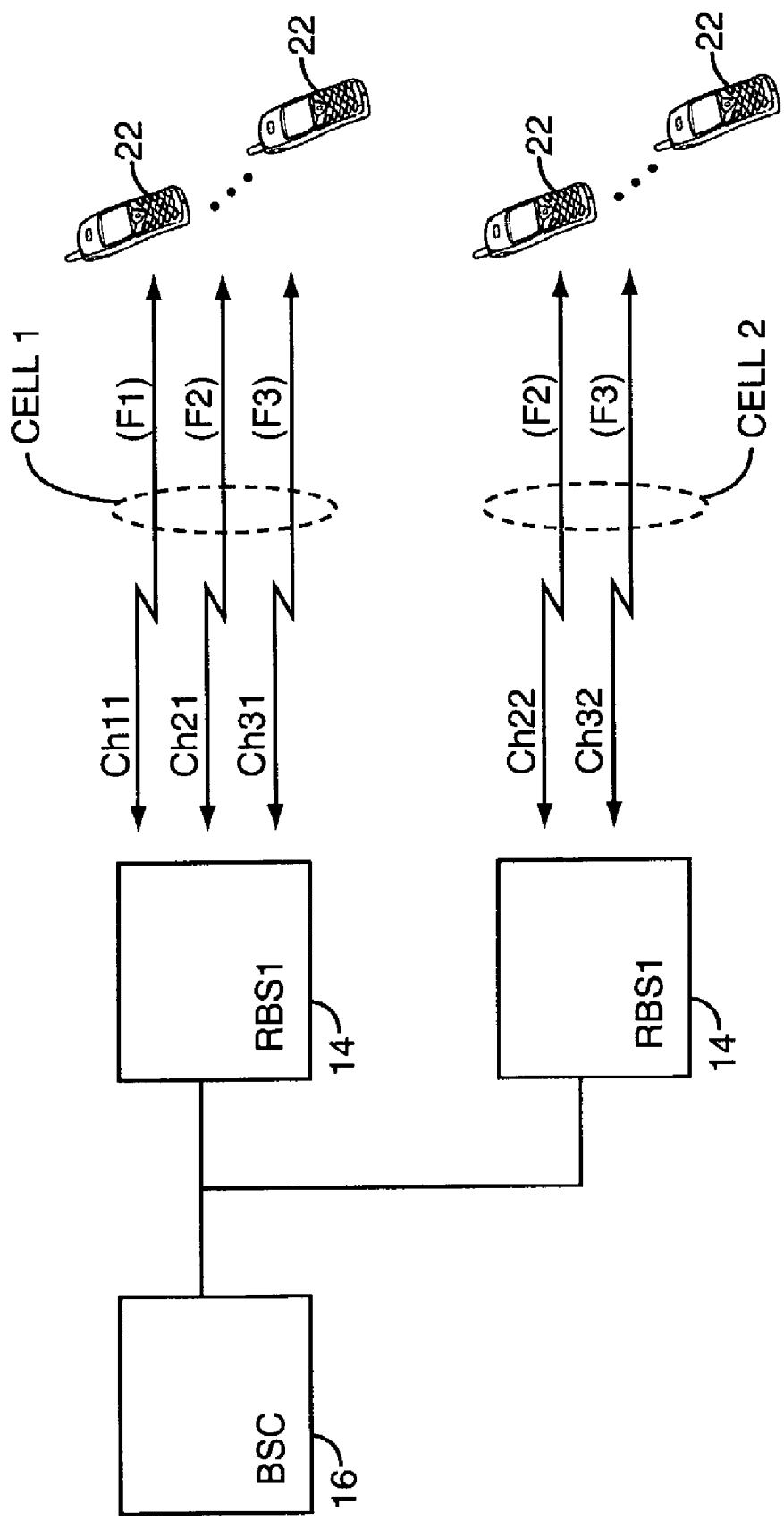
FIG. 2 is a diagram of an exemplary BSC/RBS arrangement illustrating the use of different sets of CDMA carrier frequencies in different cells.

For example, FIG. 2 illustrates two RBSs 14, RBS1 and RBS2, operating under control of a common BSC 16. RBS1 provides three CDMA channels, Ch11, Ch21 and Ch31, each in a different carrier frequency, while RBS2 provides two CDMA channels, Ch22 and Ch32. With this channel nomenclature, Ch11 denotes the CDMA channel defined by carrier frequency F1 and Cell 1, Ch32 thus denotes the CDMA channel defined by carrier frequency F3 and Cell 2, and so on. From the illustration, one sees that three carrier frequencies (F1 ... F3) are used for Cell 1 by RBS1, while RBS2 uses only two carrier frequencies (F2, F3) in Cell 2.

As such, a particular mobile station 22 may be simultaneously served in soft handoff (i.e., multiple CDMA channel assignments) on Ch21 and Ch22, or on Ch31 and Ch32. In other words, a mobile station 22 operating on either carrier frequency F2 or F3 can be served on CDMA channels of that frequency from either or both Cells 1 and 2. In contrast, a mobile station operating on carrier frequency F1 can be served only from Cell 1, i.e., can only be served on Ch11, since carrier frequency F1 is not available in Cell 2.

The illustrated scenario gives rise to two observations. First, mobile stations 22 operating on either F2 or F3 can move between Cells 1 and 2 without requiring a change in carrier frequency assignment, and, depending on current radio conditions and resource availability, be served in soft handoff by assigning radio link resources for the same mobile station 22 on both Ch21 and Ch22, or on both Ch31 and Ch32. Second, a mobile station 22 that moves from Cell 1 to Cell 2, if operating on carrier frequency F1, will require reassignment to either F2 or F3. Such a frequency reassignment requires an intra-BSS HHO; here, "intra" denotes that after the HHO, the control of the call remains at BSC 16.

Besides these intra-BSS HHOs, the other primary type of HHO involves different BSCs 16, wherein a current ("source") BSC 16 cooperates with a destination ("target") BSC 16 to handoff mobile stations 22 between different systems (BSSs 20). It should be noted that FIG. 1 illustrates BSSs 20 as belonging to the same network 10, but different networks may be involved.

The Inter-frequency Inter-BSS HHO function provides the BSS with the capability to handoff a mobile station moving across the coverage area boundary of adjacent BSSs while in active traffic with the BSS. At the handoff boundary, the cells belonging to the source BSS and the target BSS often operate on a different frequency assignment, and possibly on a different band class. Note that the MSC and BSC-MSC A-interface messages are involved in resources allocation for inter-BSS hard handoff. After the handoff, the traffic channel termination point (the Service Distribution Unit or SDU) is moved from source BSS to target BSS. The difference between inter-MSC and intra-MSC hard handoff is transparent to BSC.

In contrast, an inter-frequency intra-BSS hard handoff function allows a BSS 20 to provide service to mobile stations 22 that are moving into the coverage area of a cell 12 within the same BSS that does not support the CDMA frequency assignment used by the traffic channels in the mobile station's current active set. Thus, the function is invoked when a mobile station 22 is transitioned between different frequency assignments or band classes, where the traffic channel termination point (SDU) is maintained at the same BSS 20 prior to and after the handoff. The fact that the SDU is not relocated to a different BSS 20 is used in this context as a generalization of intra-BSS handoff to include those cases in which the cells 12 belonging to the target active set may belong to multiple BSSs 20.

Figure 3:
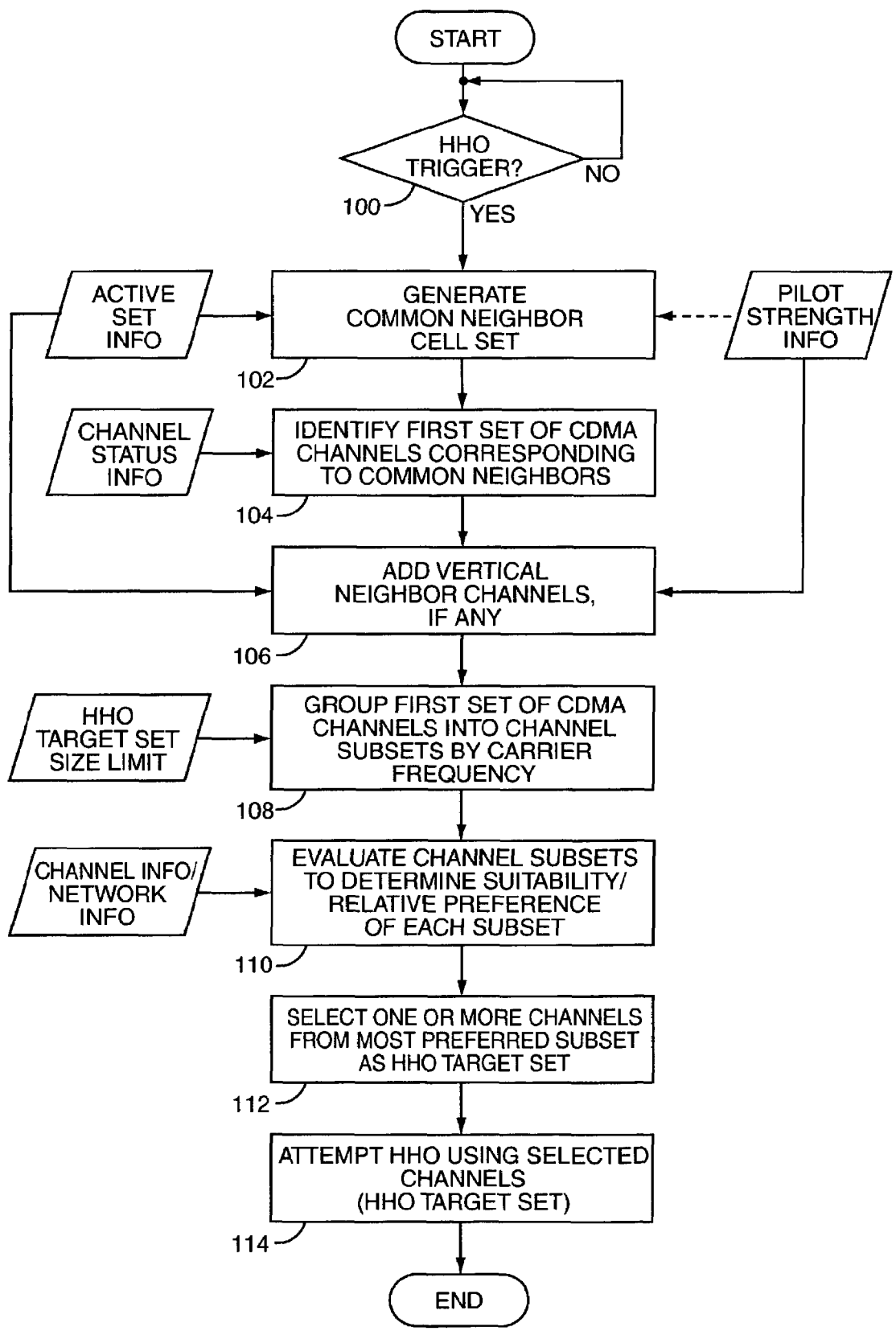
FIG. 3 is a logic diagram for an exemplary embodiment of the present invention.

With these exemplary handoff details in mind, FIG. 3 illustrates logic for practicing an exemplary embodiment of the present invention, which provides for both intra-BSS and inter-BSS HHO target generations. The illustrated logic typically involves, for inter-BSS HHO, two BSCs 16, e.g., one "source" BSC and one "target" BSC. For intra-BSS HHO, it typically involves one BSC 16 e.g., the same BSC 16 as both the "source" and the "target" BSC, or more than one BSCs 16 e.g., one BSC 16 as the "source" and itself plus other BSCs 16 as "target" BSCs. Regardless, the overall HHO target generation method enabled by the logic of FIG. 3 enables network 10 to dynamically generate a target set of one or more CDMA channels or cells to be used for HHO of a mobile station 22.

Exemplary processing begins with a source BSC 16 "waiting" for a HHO trigger event for any one of the mobile stations 22 it currently supports (Step 100). Note that the source BSC 22 continues all other call processing and control activities as needed. The triggering event may be a RTD value exceeding a maximum round trip delay threshold, such as where the mobile station 22 is moving away from a supporting RBS 14, or the event may be the presence of one or more PBU pilots as reported by the mobile station 22 in a Pilot Strength Measurement Message (PSMM), for example.

Responsive to a HHO trigger for a particular mobile station 22, the source BSC 16 generates a "common neighbor" set of cells (Step 102) using active set information for the mobile station 22 and, if the HHO trigger is a PBU-based trigger, additionally using PSMM information, or the like. The particulars of common neighbor cell set generation may be varied responsive to the type of HHO trigger. Thus, as detailed later herein, common neighbor set generation may be varied for RTD-based HHO triggers and PBU-based HHO triggers.

With identification of the common neighbor cells, the source BSC 16 then identifies the corresponding CDMA channels, i.e., the CDMA channels that are associated with the set of common neighbor cells (Step 104). These channels may be thought of as a first or initial set of potential target channels. At this point, or later in the dynamic target generation process, the source BSC 16 may consider CDMA channel status. For example, the source BSC 16 may access network information regarding channel states, e.g., "available" or "wilted," in determining whether a particular channel should be considered as a potential HHO target. Note that the same information might be used later in the process to "keep" or "discard" particular channels from consideration as HHO targets in the final target set.

Preferably, the source BSC 16 adds to the initial set of CDMA channels by supplementing it with "vertical neighbor" channels, if any (Step 106). The particular vertical neighbor channels added preferably depends on the type of HHO trigger, as will be detailed later herein. Next, the source BSC 16 "evaluates" the set of potential target channels to identify one or more particular channels to be selected as a "HHO target set" for use in HHO of the mobile station 22.

Evaluation of the first set of channels comprises, in an exemplary embodiment, grouping them into one or more channel subsets by CDMA carrier frequency, which process results in generating "Same Frequency Sets," referred to herein as "SFSs" (Step 108). In more detail, in a multicarrier network environment, the first set of channels likely includes CDMA channels at two or more carrier frequencies, and SFS generation initially is based on grouping subsets by the different carrier frequencies.

The channels comprising each SFS may then be evaluated to determine the suitability of that SFS for use in HHO. That is, the SFSs may be evaluated to determine the relative preference of each SFS (Step 110). Data that may be used in such evaluation includes, in an exemplary embodiment, vertical neighbor count, channel types, channel status, system affiliation, and system compatibility.

Exemplary channel types include "standard" and "border" channel types, with standard type channels generally being favored over border type channels, since handoff to border channels may cause an immediate invoking of another HHO. Exemplary system affiliation values include "same system" or "foreign system," with the foreign system designation corresponding to channels supported by other than the current BSS 20. Thus, the same system channels generally are preferred over foreign system channels. Exemplary compatibility values include "compatible" and "non-compatible," where the "non-compatible" simply indicates that the particular channel in question cannot be used to support the current service option and/or radio configuration of the call, and/or if the systems operate at different protocol revisions, and/or if the individual CDMA channel information of the foreign cells is not available.

Based on the evaluation of each SFS, a most-preferred set of SFSs is identified, and one or more of the channels in that most-preferred SFS are selected as the dynamically generated "target set" of CDMA channels (Step 112), and HHO is attempted using the dynamically generated target set (Step 114). Note that the inclusion of a particular channel (or its associated cell) in the target set does not mean that it will actually be used to support HHO of the mobile station 22.

For example, where inter-BSS HHO is involved, the source BSC 16 may dynamically generate a target set of cells for HHO, and provide that information to a supporting MSC 18 for transfer to the target BSC 16. At that point, the target BSC 16 determines whether the identified target cells actually have the resources needed to establish radio links to the mobile station 22. If one or more of the identified cells does not have such resources, it will not be used to support HHO of the mobile station 22 in HHO.

In another exemplary embodiment, HHO target information based on the dynamically generated target set is sent to the mobile station 22 in support of mobile-assisted HHO (MAHHO). Thus, the mobile station 22 receives information identifying one or more target CDMA channels. Using such information, the mobile station 22 measures signal strengths for the one or more target channels and returns such information to the network 10, i.e., returns it to the BSC 16. The signal strength information is based on pilot signal strength measurements made by the mobile station 22 on one or more target channels. The mobile station 22 may temporarily change its frequency settings as needed to measure the signal strength for target channels at other than its current frequency assignment.

The BSC 16 receives the returned signal strength measurement information from the mobile station 22 and may thus use such information to refine, modify, or otherwise adjust the HHO target set. In one exemplary embodiment, the BSC 16 may eliminate CDMA channels from the target set if the signal strength for those channels as reported by the mobile station 22 is unsatisfactory. In another exemplary embodiment, the BSC 16 may use the returned signal strength information to prioritize the channels in the target set, such that channels may be ranked in order of preference based on reported signal strength.

In one or more exemplary embodiments, the BSC 16 dynamically generates two target sets for intra-BSS HHO: a first, most preferred target set, and a second, less preferred target set. These two target sets may include CDMA channels of different frequencies. Regardless, the BSC 16 may use both target sets to perform an optimal radio link resource allocation, or may use the second target set if it determines that sufficient resources are not available from the first, more preferred target set. The second target set may be selected from the first set of channels as a less preferred alternative set of targets relative to the most preferred target set.

Figure 4:
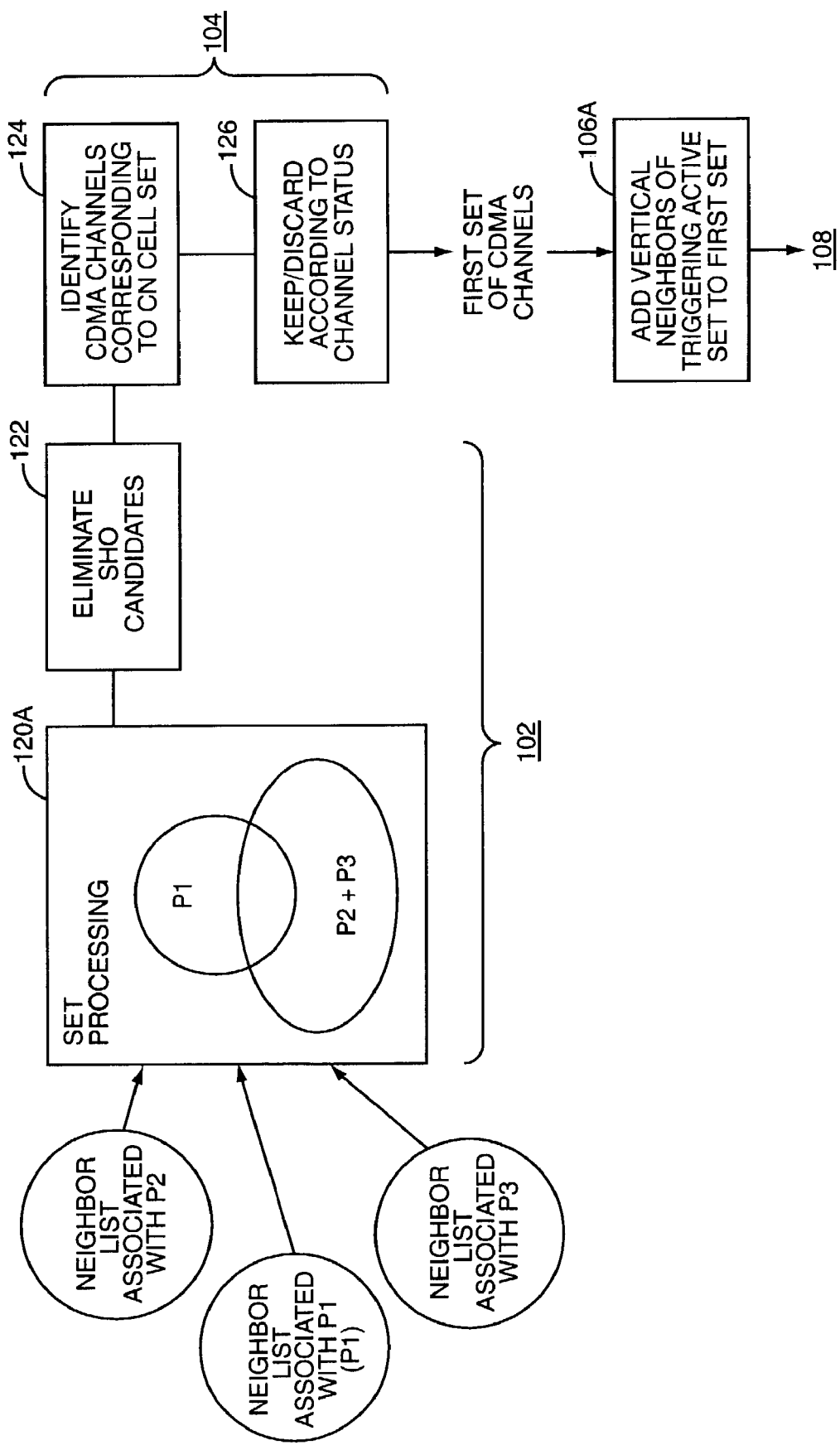
FIG. 4 is an exemplary diagram of generating a first set of cells to be used in identifying target channels for RTD-based HHO triggering.

In any case, the above discussion noted that the first or initial set of CDMA channels is identified, at least in part, based on identifying a common neighbor set of cells and on considering vertical neighbor channel information. FIG. 4 illustrates exemplary logic for identifying that initial set of channels in the context of RTD-based HHO triggering.

Identification of the common neighbor set of cells (Step 102 above) involves manipulation of the "neighbor list" information stored in network 10 for each of the cells associated with the pilots identified in the mobile station's active set report (Step 120A and 122). As an example, assume that the active set includes three pilots (P1, P2, and P3), and that P1 is identified as the "triggering pilot," where an exemplary definition of the triggering pilot is the active set pilot having the smallest RTD value that exceeds its defined RTD trigger threshold. Assuming that P1 is the triggering pilot, designated as Pt, exemplary common neighbor identification involves set processing based on the following equation, $$CommonNeighborSet = \bigcup_{C_i \in TriggeringActiveSet} \{NeighborList(C_t) \cap NeighborList(C_i)\}. \quad (1)$$

Where, for the current example, $C_t$=the cell associated with P1, and $C_i$=the cell associated with P2, and the cell associated with P3.

Thus, exemplary common neighbor cells are those cells identified in the neighbor list set formed as the union of the neighbor list information for the triggering pilot's cell intersected with the neighbor list information of each cell corresponding to the remaining pilots in the active set—equivalently, the common neighbor set of cells may be generated by intersecting the triggering pilot cell's neighbor list with the union of neighbor lists for the cells associated with any remaining pilots in the active set.

From this common neighbor set, exemplary processing identifies and discards any cells that include CDMA channels that are "soft" handoff targets for the mobile station 22 (Step 122). In this context, a soft handoff target is a same-frequency CDMA channel in a neighboring cell. After such soft handoff exclusions, the initial (first) set of CDMA channels may be identified as those CDMA channels corresponding to the remaining common neighbor cells (Step 124). Note that at this point, or at some later point in dynamic target generation, channel status, e.g., available or wilted, may be used to discard unavailable channels from the set of channels to be considered (Step 126).

Exemplary processing adds vertical neighbor CDMA channels, if any, to this first set of channels, such that exemplary target set generation considers the universe of channels that are (1) common neighbor channels or (2) vertical neighbor channels. As noted, for RTD-based HHO triggering, the vertical neighbors of interest are the CDMA channels within the cells corresponding to the active set pilots that are at carrier frequencies other than the mobile station's currently assigned carrier frequency (Step 106A). With the addition, processing continues as described above for Step 108 of FIG. 3.

Figure 5:
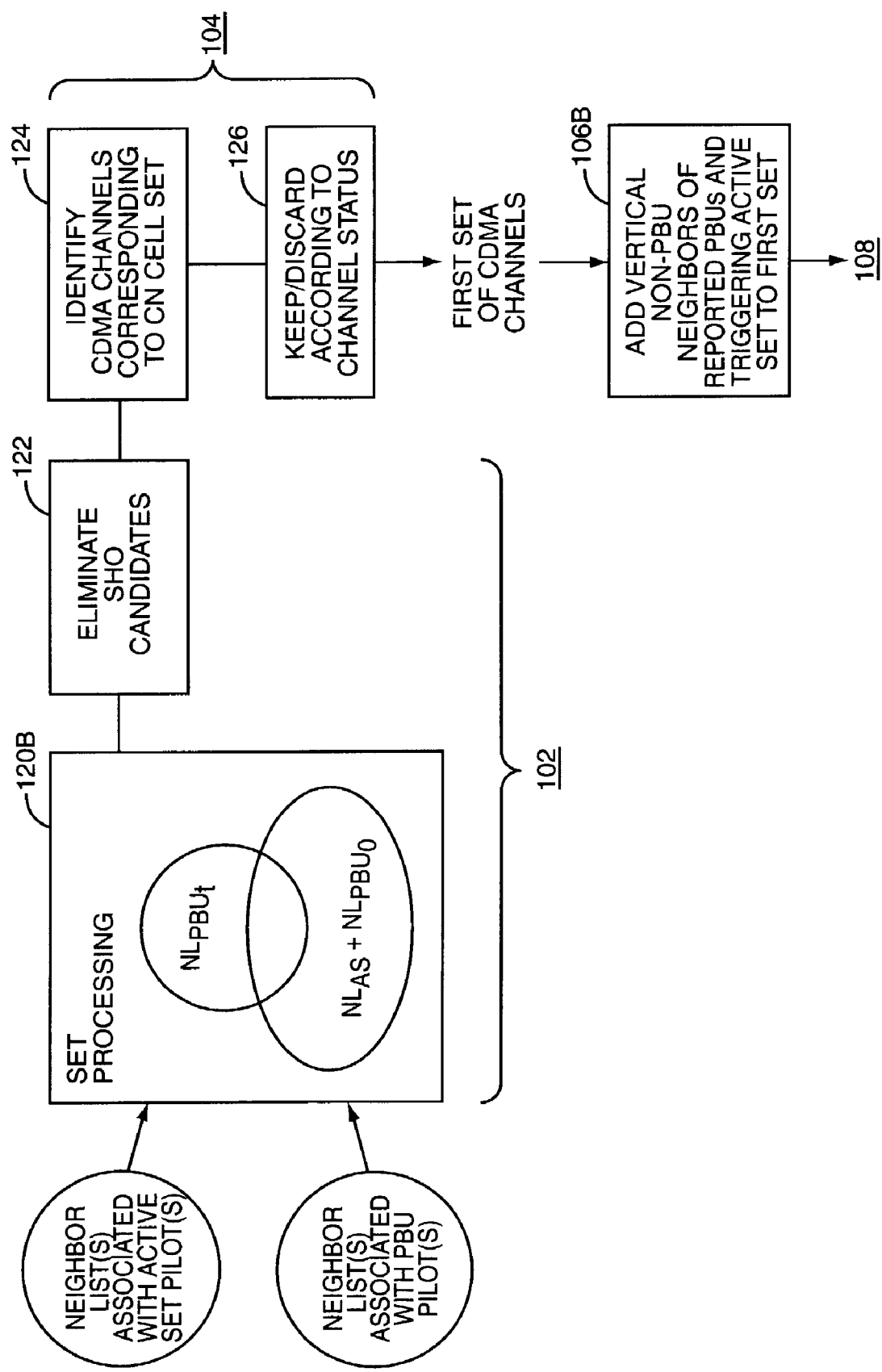
FIG. 5 is an exemplary diagram of generating a first set of cells to be used in identifying target channels for PBU-based HHO triggering.

FIG. 5 essentially is the same as FIG. 4 in that it illustrates exemplary generation of the initial set of CDMA channels to consider in dynamic target generation, but FIG. 5 includes exemplary PBU-based HHO triggering details. For example, common neighbor generation is based on intersecting the neighbor list information corresponding to a "triggering PBU pilot," $NL_{PBU_t}$ with the union of neighbor list information corresponding to any other reported PBU pilots, $NL_{PBU_o}$ and the pilots identified in the mobile station's active set, $NL_{AS}$ (Step 120B). Thus, as before, the neighbor list information for the cells corresponding to the active set pilots is used in common neighbor generation, but here the set prioritization is keyed on the triggering PBU pilot rather than on a triggering active set pilot.

In this context, the triggering PBU pilot may be identified as the PBU pilot reported as having the greatest signal strength of all reported PBU pilots. Note that PBU pilots "seen" by the mobile station 22 may be reported to the network 10 in, for example, a PSMM or other type of radio environment report message transmitted from the mobile station 22. In any case, the soft handoff candidate cells are discarded as before (Step 122), and the channels in the first set are identified as those channels corresponding to the remaining common neighbor cells (Step 124). As before, particular channels may be dropped from consideration at this point, or at a later point, based on channel status (Step 126).

Also, as before, vertical neighbor channels may be included in the first set of channels (Step 106B), but such actions are slightly modified for the PBU-based triggering context. More particular, the vertical neighbor channels of interest include the non-PBU vertical neighbors of the active set pilots, or the non-PBU vertical neighbors of one or more of any PBU pilots reported by the mobile station 22, or a combination thereof. The "non-PBU" requirement simply reflects the fact that PBU-based pilots generally are not associated with ordinary CDMA channels capable of carrying user traffic and thus, a PBU pilot at a different carrier frequency but within the same cell as the triggering pilot technically is a "vertical neighbor" but would not be added to the first set because of its unsuitability for traffic channel assignments in support of handoff.

Figure 6:
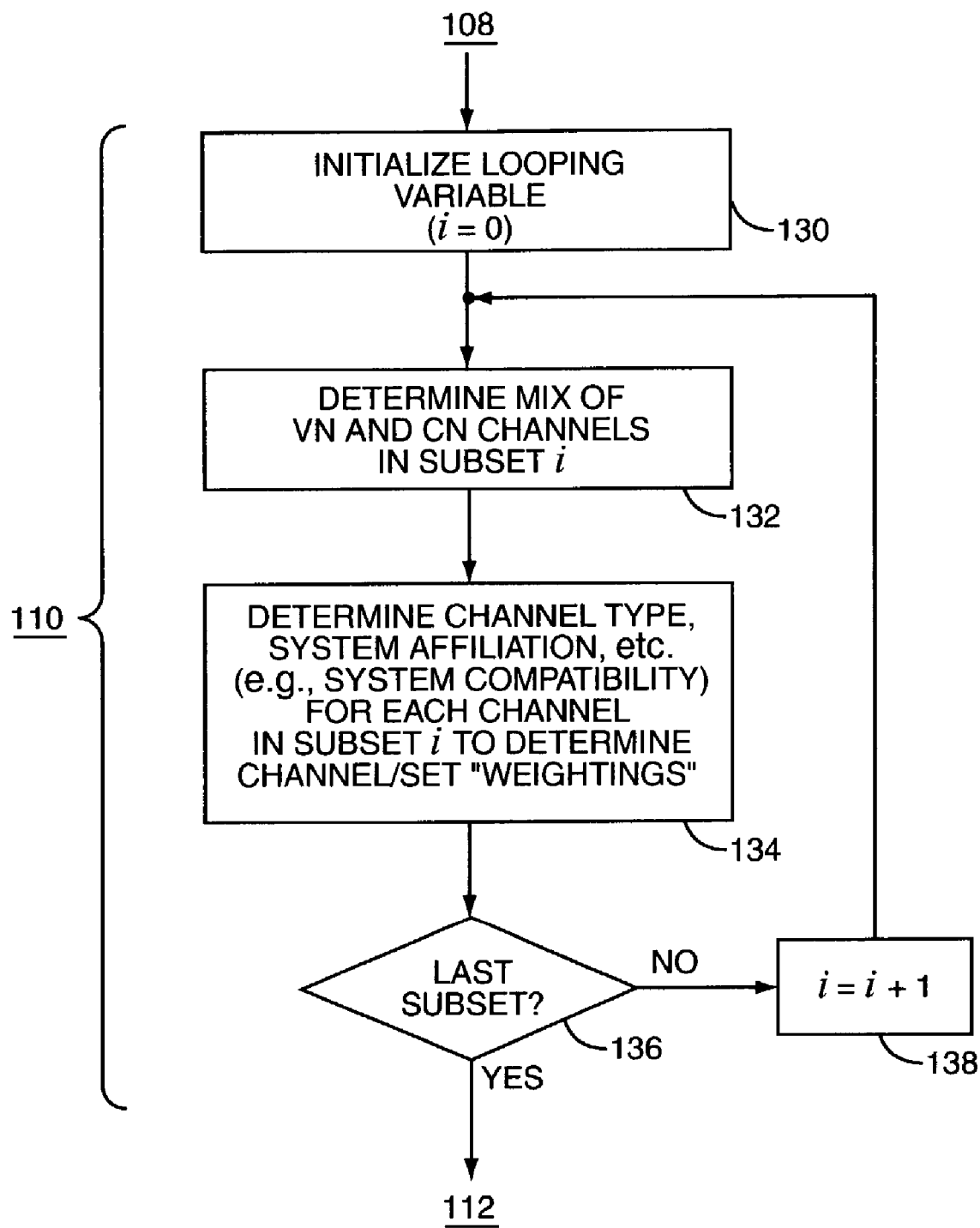
FIG. 6 is an exemplary diagram of channel subset evaluation as part of HHO target set generation.

FIG. 6 illustrates exemplary, general logic for processing the first set of channels in either the RTD- or PBU-based triggering context. Thus, after SFS channel grouping of channels comprising the first set, dynamic target set generation evaluates each SFS to characterize it in terms of its suitability and relative desirability for use in forming the target set of channels. Thus, an exemplary first step is initialization of a looping variable, i, to be used in "stepping" through the collection of SFSs within the larger first set of channels.

Thus, the looping variable i might be initialized to "0" or some other starting value (Step 130). Then, for SFS(i), the mix of channels (distinguished as vertical neighbor or common neighbor channels) is determined (Step 132). Processing for SFS(i) continues with a characterization of the channels within SFS(i) according to one or more network parameters (Step 134). In an exemplary embodiment, SFS(i) is characterized based on the channel types (standard or border) included therein, the system affiliations (same or foreign) of its included channels, and the channel compatibilities (e.g., current mobile station service options supported or not supported).

One approach to such SFS characterization involves the use of channel weighting system wherein each channel in SFS(i) is assigned a weighting value that reflects its relative preference for use as a HHO target. In an exemplary weighting system, a vertical neighbor channel might be preferentially weighted relative to a common neighbor channel. Likewise, a same system channel might be preferentially weighted as compared to a foreign system channel.

In any case, the exemplary weighting of an individual channel within SFS(i) reflects its overall attractiveness, and thus may be built up in consideration of channel type, system affiliation, etc. With this approach, then, the cumulative or overall "weight" of SFS(i) may be determined as the combination of channel weightings for individual channels within SFS(i), or determined based on some other channel weight combining scheme. Processing then continues with a determination of whether additional SFSs remain (Step 136). If so, the looping variable i is incremented (Step 138), and the next SFS(i) is evaluated as described above. With evaluation of the last SFS, processing continues with selection of one or more channels of the most-preferred set of SFSs as the dynamically generated target set (Step 112 from FIG. 3).

An exemplary algorithm for categorizing each SFS for comparison of SFSs to select the target set of channels may be governed by the following high level rules or principles. First, intra-BSS HHO is favored over Inter-BSS HHO if the conditions for intra-BSS HHO are favorable. The conditions for Intra-BSS HHO are favorable if the channel types in SFS(i) are not all border and the vertical neighbor(s) (VN) of the triggering channel are not border type channels.

Non-compatible foreign cells are those cells under consideration that belong to a foreign system that is not compatible with the source system. A flag may be maintained to indicate the presence of non-compatible foreign cells corresponding to channels within the SFS. BSSs are considered incompatible if they do not support the service option and/or radio configuration of the current call, and/or if they operate at different protocol revisions and/or if the individual CDMA channel information of the foreign cells is not available. HHO to such cells will have to be of the inter-BSS HHO type. Thus, the presence of such cells corresponds to a next-highest preference because it probably indicates why HHO is needed in the first place. Another reason for triggering HHO is a discontinuity of carrier frequency coverage.

Another element of the preference scheme is the avoidance of using border channels as targets. For example, if all channels in the dynamically generated target set were border type channels, there is a significant likelihood that another HHO will be triggered almost immediately after completion of the current HHO. Thus, handing off with all border type channels risks setting up a HHO ping-ponging. In particular, the preference scheme avoids the use of a border type channel that also is a vertical neighbor of the triggering channel. The reason for such avoidance is that if such a channel is a border type channel, it generally indicates that the network operator wants to avoid using that channel as a HHO target.

Further, the exemplary preference scheme considers vertical neighbor channels as being more favorable than common neighbor channels, which are those channels corresponding to the common neighbor cell set as described above. The reason for such preference is that vertical neighbor channels generally are better intra-BSS HHO targets than are common neighbor channels.

For cases where all vertical neighbor channels in the SFS are border type, or where the vertical neighbor channel of the triggering channel is of type border, and if a defined set size limit has been reached for the first set of channels, the presence of at least one standard type foreign cell will favor inter-BSS HHO over intra-BSS HHO. The basis for this preference is that an intra-BSS HHO would risk ping-ponging as noted above, and thus, these circumstances, it is "better" to move the call (the mobile stations' connection) to the foreign system completely if that option is possible. Finally, in an exemplary embodiment, generation of the target set as all border type cells is allowed as a last resort.

FIG. 7 illustrates an exemplary method consistent with the above description for determining target set generation, where the different generation cases are denoted as Px, and are listed in top-to-bottom order of decreasing preference. Case P1 is satisfied if any SFS exists where the vertical neighbor of the triggering channel was not a border type channel and there was at least one standard vertical neighbor channel within the SFS. If case P1 is satisfied, the source BSS 20 attempts intra-BSS HHO.

Case P2 is satisfied if any SFS exists where the different system (foreign system affiliation) flag as described above is set, i.e., where there is some incompatibility between the source BSS and at least one foreign BSS with respect to system capability (service option support), and or CDMA protocol revision, or the type (border, standard, or beacon) of at least one foreign system channel in the SFS is unknown. If case P1 is not satisfied concurrently with satisfaction of case P2, the source BSS 20 attempts an inter-BSS HHO.

Continuing in order of decreasing preference, case 3 is satisfied where any SFS includes at least one standard type common neighbor channel and no vertical neighbor channels, while case P4 is satisfied where any SFS includes at least one border type vertical neighbor channel and at least one standard type common or vertical neighbor channel. If either case 3 or 4 is satisfied, the source BSS 20 attempts an intra-BSS HHO. Failing that, case 5 is satisfied where any SFS includes vertical neighbor channels that all are of type border and further includes at least one foreign system common neighbor channel. With satisfaction of case 5, the source BSS 20 attempts an inter-BSS HHO. In all other instances, case P6, the source BSS 20 attempts intra-BSS HHO.

The exemplary logic embodied in FIG. 7 and described above should be interpreted in the following manner: all of the possible target frequencies are considered for a given case Pi and if at least one carrier frequency satisfies that Pi, the subsequent preferences (the less preferred cases) are ignored. The table column under which the condition of the most preferred case Pi is satisfied determines the type of HHO (intra- or inter-BSS) to be attempted. Those skilled in the art should appreciate the possibility for varying the above described set evaluations, and that the broader purpose of the invention is to provide dynamic generation of HHO target sets in contrast to use of statically configured HHO target information as used in conventional networks. Similarly, FIG. 8 should be understood as an exemplary illustration of a BSC functional arrangement that may be used to support the present invention. Further, it should be noted that FIG. 8 represents a simplified illustration because lower level BSC details vary between equipment vendors and, in any case, are not germane to understanding the present invention.

Further, as was noted herein, the source BSC 16 may generate the target set information in terms of target cell identifications (IDs), particular for inter-BSS HHO. For example, the target BSC 16 may, in a simple embodiment, report the IDs of the common neighbor cell set as generated above. It may add cell IDs for vertical neighbors as needed or desired, and then report the target set of cell IDs to the target BSC 16, e.g., by reporting target cell IDs to an associated MSC 18. The target BSC 16 would then use the target set cell ID information to determine which CDMA channels within the targeted cells should be selected for HHO. The target BSC 16 may then report cell IDs (it may not use all of the targeted cells) and the selected frequency to be used for HHO back to the source BSC 16. Also, note that the target BSC 16 may generate the target set information as cell ID information rather than target channel information. For example, if channel information is unavailable for one or more channels within a preferred subset of channels in the first set of channels, the target BSC 16 may simply flag these channels, remember their corresponding cell IDs, and then report the cell IDs for those channels as the target set information rather than reporting particular channels.

Figure 8:
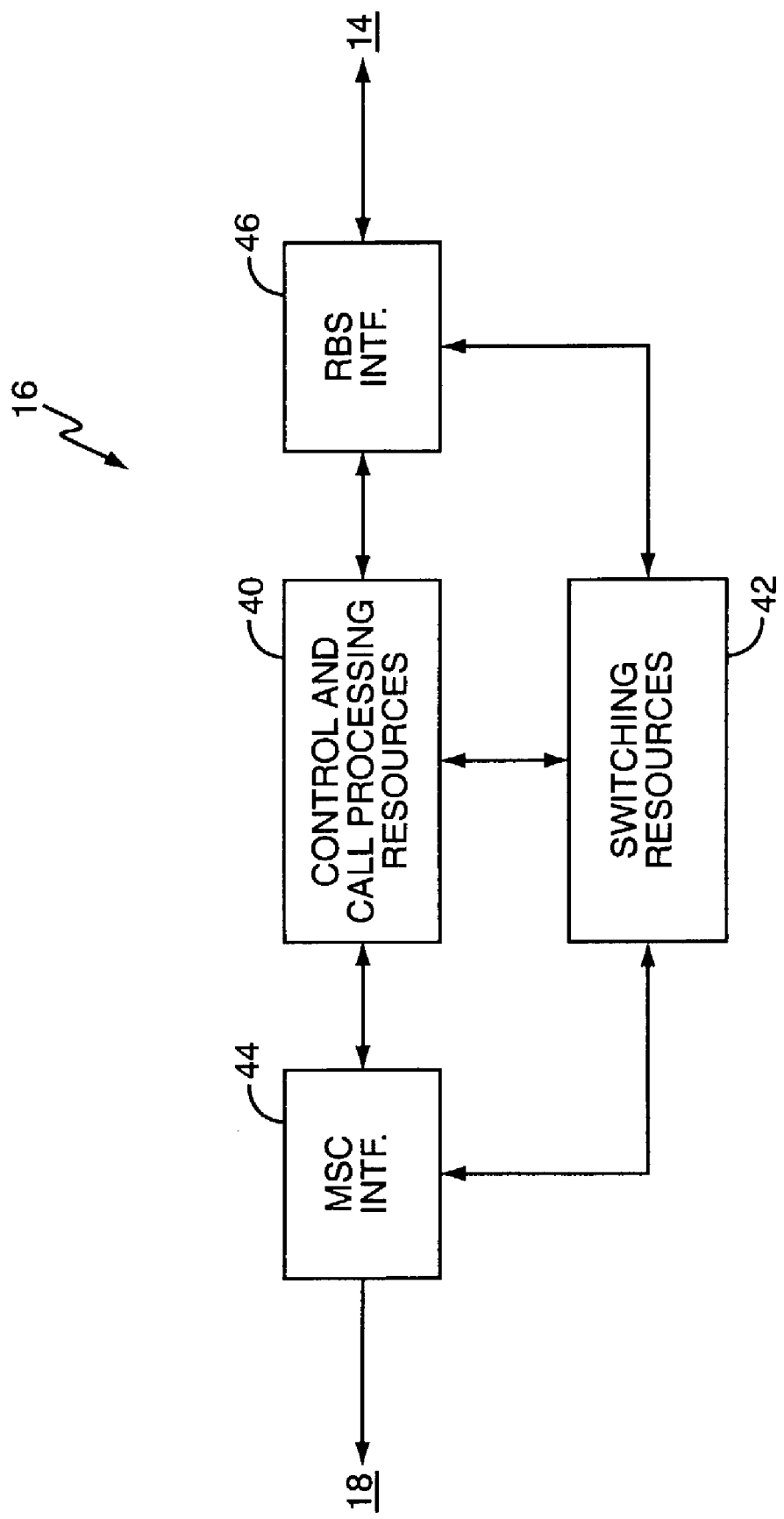
FIG. 8 is an exemplary diagram of a BSC functional arrangement in accordance with the present invention.

With the above exemplary embodiments in mind, FIG. 8 illustrates an exemplary functional arrangement for BSC 16, in support of the present invention in the source or the target role. As shown, BSC 16 comprises control and processing resources 40, e.g., processing and control circuits, switching resources 42, a MSC interface 44, and a RBS interface 46. Generally, the inter-entity interfaces, such as MSC interface 44 and RBS interface 46, between the BSC 16 and other network entities conform, where appropriate, to the standards defined by the Interoperatibility Standards (IOS).

Control and call processing resources 40 may comprise a mix of hardware and software, and may include both dedicated and general-purpose processing resources and storage elements. Preferably, the BSC 16 is provisioned with information supporting the present invention, including neighbor list data, cell type data, etc., along with the computer instructions stored in computer readable media for implementing the various processing and control tasks associated with the present invention. Thus, in an exemplary embodiment, the control and processing resources include one or more microprocessors or other digital logic circuits and associated supporting circuitry having access to stored program instructions and supporting data to support functioning as a hard handoff controller supporting the dynamic generation of target channel sets for HHO in accordance with the present invention. Thus, as used herein, the term "handoff controller" should be construed broadly to encompass one or more processing elements and supporting circuits within the BSC 16.

BSC circuits may further include interface and switch processing or control elements supporting, for example, control and traffic signaling between the MSC interface 44 and the RBS interface 46. The switching resources 42 may be implemented, for example, as an ATM-based switching fabric routing call traffic and control for the BSC 16.

However, as noted, these BSC implementation details are exemplary only, and may be varied as needed or desired. Indeed, the present invention may be varied as needed or desired, particularly in terms of the implementation details associated with common neighbor and target set generation. As such, the present invention broadly encompasses the dynamic generation of HHO targets based not on statically configured target set information, but rather on the mobile station's current radio conditions and cell type information and/or other network topology and frequency information, along with target resource availability. Therefore, the present invention is not limited by the above exemplary details, but rather is limited only by the scope of the following claims and their reasonable equivalents.

What is claimed is:

1. A method of supporting hard handoff of a mobile station in a wireless communication network comprising:
   maintaining current active set information for the mobile station in a base station controller (BSC) within a source base station subsystem (BSS);
   dynamically generating a hard handoff target set identifying one or more CDMA channels or cells as hard handoff targets based on the current active set information responsive to a hard handoff trigger for the mobile station, wherein dynamically generating the hard handoff target set comprises defining a target set size limit on a per CDMA channel basis, such that a size of the hard handoff target set generated for the mobile station is controlled as a function of the mobile station's current location; and
   transferring target set information for the dynamically generated hard handoff target set from the BSC to a target BSS if the hard handoff is an inter-BSS hard handoff.

2. The method of claim 1, further comprising defining a relatively smaller target set size limit for CDMA channels in high-volume service areas, and defining relatively larger target set sizes for CDMA channels in low-volume service areas.

3. The method of claim 1, further comprising setting the target set size limit for a particular CDMA channel based on balancing hard handoff reliability, which increases with larger target set sizes, and capacity utilization efficiency, which decreases with larger target set sizes.

4. The method of claim 1, wherein dynamically generating the hard handoff target set comprises identifying a common neighbor set of cells using neighbor list information for cells corresponding to pilots in the active set; identifying a first set of CDMA channels based at least in part on the common neighbor set of cells; and evaluating CDMA channels in the first set based at least on channel type and Base Station System (BSS) affiliation to identify one or more CDMA channels as members of the hard handoff target set.

5. The method of claim 4, wherein identifying the common neighbor set includes excluding soft handoff candidate cells from the common neighbor set of cells so that the first set of CDMA channels do not belong to cells that could be used for soft handoff of the mobile station.

6. The method of claim 4, wherein identifying the first set of CDMA channels includes identifying CDMA channels associated with the common neighbor set, and selectively includes identifying vertical neighbor CDMA channels of the active set pilots, or of one or more of any reported Pilot Beacon Unit (PBU) pilots, or of both the active set pilots and one or more of any reported PBU pilots.

7. The method of claim 4, wherein evaluating CDMA channels in the first set comprises generating channel subsets by carrier frequency and evaluating channel type, and BSS affiliation per subset to identify a preferred subset as the target set subject to a defined set size limit.

8. The method of claim 7, wherein evaluating CDMA channels in the first set further comprises evaluating BSS characteristics per subset, including evaluating BSS compatibility.

9. The method of claim 7, further comprising identifying a CDMA channel corresponding to a triggering pilot, and limiting a size of the target set based on a size limit value defined for that corresponding CDMA channel.

10. The method of claim 1, wherein dynamically generating the hard handoff target set comprises identifying a first set of CDMA channels using at least neighbor list information for all pilots in the mobile station's active set, and selecting one or more CDMA channels from the first set as selected targets for hard handoff of the mobile station.

11. The method of claim 10, wherein selecting the one or more CDMA channels from the first set as selected targets for hard handoff of the mobile station comprises grouping CDMA channels within the first set into one or more subsets based on CDMA carrier frequency; determining a relative selection preference for each subset; and selecting at least some of the CDMA channels in a most preferred subset as the selected targets.

12. The method of claim 1, wherein dynamically generating the hard handoff target set comprises identifying CDMA channels that are potential targets using neighbor list information for all pilots in the active set and vertical neighbor information for one or more pilots in the active set, if the hard handoff trigger is a Round-Trip-Delay (RTD) based trigger.

13. The method of claim 1, wherein dynamically generating the hard handoff target set comprises identifying CDMA channels that are potential targets using neighbor list information for all pilots in mobile station's active set and neighbor list information for any Pilot Beacon Unit (PBU) pilots reported by the mobile station, and vertical neighbor information for all pilots in the active set and for one or more of the reported PBU pilots, if the hard handoff trigger is a PBU based trigger.

14. The method of claim 1, wherein dynamically generating the hard handoff target set comprises:
 generating a common neighbor cell set based on neighbor list information for cells associated with all pilots identified in the active set;
 removing any cells from the common neighbor cell set that are soft handoff candidate cells;
 generating a first set of CDMA channels that are potential targets for hard handoff by identifying CDMA channels corresponding to the remaining cells in the common neighbor cell set;
 supplementing the first set of CDMA channels with selected vertical neighbor CDMA channels, if any; and
 evaluating the first set of CMDA channels based on carrier frequency to determine whether to perform an intra-Base Station System (BSS) or an inter-BSS hard handoff, and to identify particular ones of CDMA channels in the first set to be included in the hard handoff target set.

15. The method of claim 1, wherein dynamically generating the hard handoff target set comprises identifying a first set of cells based on neighbor list information for cells corresponding to pilots in the active set and corresponding to any Pilot Beacon Unit (PBU) pilots reported by the mobile station if the hard handoff trigger is a PBU based trigger.

16. The method of claim 15, wherein identifying a first set of cells based on neighbor list information for cells corresponding to pilots in the active set and corresponding to any PBU pilots reported by the mobile station comprises identifying those CDMA channels associated with a set of cells formed as the intersection between triggering PBU neighbor list information and the unions of active set and PBU set neighbor list information.

17. The method of claim 15, further comprising adding vertical neighbor channels of the pilots in the active set to the first set of CDMA channels.

18. The method of claim 17, further comprising identifying the triggering PBU pilot as the strongest of all reported PBU pilots.

19. The method of claim 1, further comprising:
 transferring hard handoff target set information to the mobile station, said hard handoff target set information identifying one or more CDMA channels at one or more frequencies in the hard handoff target set; and
 receiving signal strength measurements from the mobile station for at least one of the one or more CDMA channels identified in the hard handoff target set.

20. The method of claim 19, further comprising eliminating one or more of the CDMA channels in the hard handoff target set based on the signal strength measurements returned by the mobile station.

21. The method of claim 19, further comprising assigning relative preferences to one or more CDMA channels in the hard handoff target set based on the signal strength measurements returned by the mobile station.

22. The method of claim 19, wherein receiving signal strength measurements from the mobile station for at least one of the one or more CDMA channels identified in the target set comprises receiving pilot strength reports for the at least one CDMA channel.

23. The method of claim 19, further comprising, at the mobile station, temporarily switching from a current frequency setting to a new frequency setting to obtain signal strength measurements for the at least one CDMA channel.

24. The method of claim 1, wherein the dynamically generated HHO target set is a first, most preferred target set, and further comprising generating a second, less preferred HHO target set.

25. The method of claim 24, further comprising using the first and second target sets to perform an optimal resource allocation for an intra-Base Station System (BSS) HHO of the mobile station.

26. The method of claim 24, further comprising allocating radio link resources for an intra-Base Station System (BSS) HHO of the mobile station based on the second target set if sufficient radio link resources cannot be allocated from the first target set.

27. The method of claim 24, wherein the first and second target sets include CDMA channels of different frequencies.

28. The method of claim 17, further comprising adding vertical neighbor channels of one or more of the reported PBU pilots, to the first set of CDMA channels.

29. A base station controller (BSC) to support hard handoff of a mobile station in a wireless communication network comprising processing and control circuits configured to:
 maintain current active set information for a mobile station;
 dynamically generate a hard handoff target set identifying one or more CDMA channels or cells as hard handoff targets based on the current active set information in response to a hard handoff trigger for the mobile station; and
 transfer target set information for the dynamically generated hard handoff target set to a target Base Station System (BSS) if a type of hard handoff determined from the dynamically generated target set is an inter-BSS hard handoff;
wherein the BSC applies a target set size limit on a per CDMA channel basis, such that a size of the hard handoff target set generated for the mobile station is controlled as a function of the mobile station's current location.

30. The BSC of claim 29, wherein the BSC defines a relatively smaller target set size limit for CDMA channels in high-volume service areas, and defines relatively larger target set size limits for CDMA channels in low-volume service areas.

31. The BSC of claim 29, wherein the BSC sets the target set size limit for a particular CDMA channel based on balancing hard handoff reliability, which increases with larger target set sizes, and capacity utilization efficiency, which decreases with larger target set sizes.

32. The BSC of claim 29, wherein the BSC dynamically generates the hard handoff target set at least in part by identifying a common neighbor set of cells using neighbor list information for cells corresponding to pilots in the active set; identifying a first set of CDMA channels based at least in part on the common neighbor set of cells; and evaluating CDMA channels in the first set based at least on channel type and Base Station System (BSS) affiliation to identify one or more CDMA channels as members of the hard handoff target set.

33. The BSC of claim 32, wherein the BSC further evaluates CDMA channels in the first set that correspond to other BSSs based on BSS characteristics, including BSS compatibility, to identify one or more CDMA channels as members of the hard handoff target set.

34. The BSC of claim 32, wherein the BSC excludes soft handoff candidate cells from the common neighbor set of cells so that the first set of CDMA channels do not belong to cells that could be used for soft handoff of the mobile station.

35. The BSC of claim 32, wherein the BSC identifies the first set of CDMA channels by identifying CDMA channels associated with the common neighbor set of cells after the exclusion of any soft handoff candidate cells, and selectively further includes in the first set of CDMA channels vertical neighbor CDMA channels of the active set pilots, or of one or more of any reported Pilot Beacon Unit (PBU) pilots, or of both the active set pilots and one or more of the reported PBU pilots.

36. The BSC of claim 32, wherein the BSC evaluates CDMA channels in the first set by generating channel subsets by carrier frequency, and evaluating channel type and BSS affiliation per subset, to identify a preferred subset as the target set subject to a defined set size limit.

37. The BSC of claim 36, wherein the BSC identifies a CDMA channel corresponding to the triggering pilot, and limits the size of the dynamically generated hard handoff target set based on a size limit value defined for that corresponding CDMA channel.

38. The BSC of claim 29, wherein the BSC dynamically generates the hard handoff target set by identifying a first set of CDMA channels using at least neighbor list information for all pilots in the mobile station's active set, and selecting one or more CDMA channels from the first set as selected targets for hard handoff of the mobile station.

39. The BSC of claim 38, wherein the BSC selects the one or more CDMA channels from the first set as selected targets for hard handoff of the mobile station by grouping CDMA channels within the first set into one or more subsets based on CDMA carrier frequency; determining a relative selection preference for each subset; and selecting at least some of the CDMA channels in a most preferred subset as the selected targets.

40. The BSC of claim 29, wherein the BSC dynamically generates the hard handoff target set by identifying CDMA channels that are potential targets for hard handoff using neighbor list information for all pilots in the active set and vertical neighbor information for one or more of the pilots in the active set, if the hard handoff trigger is a Round-Trip-Delay (RTD) based trigger.

41. The BSC of claim 29, wherein the BSC dynamically generates the hard handoff target set by identifying CDMA channels that are potential targets using neighbor list information for all pilots in mobile station's the active set and neighbor list information for any Pilot Beacon Unit (PBU) pilots reported by the mobile station, and vertical neighbor information for all pilots in the active set and for one or more of the reported PBU pilots, if the hard handoff trigger is a PBU based trigger.

42. The BSC of claim 29, wherein the BSC dynamically generating the hard hand off target set by:
generating a common neighbor cell set based on neighbor list information for cells associated with all pilots identified in the active set;
removing any cells from the common neighbor cell set that are soft handoff candidate cells;
generating a first set of CDMA channels that are potential targets for hard handoff by identifying CDMA channels corresponding to the remaining cells in the common neighbor cell set;
supplementing the first set of CDMA channels with selected vertical neighbor CDMA channels, if any; and
evaluating the first set of CMDA channels based on carrier frequency to determine whether to perform an intra-Base Station System (BSS) or an inter-BSS hard handoff, and to identify particular ones of CDMA channels in the first set to be included in the hard handoff target set.

43. The BSC of claim 29, wherein the BSC dynamically generates the hard handoff target set by identifying a first set of cells based on neighbor list information for cells corresponding to pilots in the active set and corresponding to any Pilot Beacon Unit (PBU) pilots reported by the mobile station if the hard handoff trigger is a PBU based trigger.

44. The BSC of claim 29 wherein the BSC transfers hard handoff target set information to the mobile station, and receives signal strength measurements from the mobile station for at least one of the one or more CDMA channels identified in the hard handoff target set.

45. The BSC of claim 44, wherein the BSC eliminates one or more of the CDMA channels in the hard handoff target set based on the signal strength measurements returned by the mobile station.

46. The BSC of claim 44, wherein the BSC assigns relative preferences to one or more CDMA channels in the hard handoff target set based on the signal strength measurements returned by the mobile station.

47. The BSC of claim 44, wherein the BSC receives a pilot strength report from the mobile station for the at least one CDMA channel.

48. The BSC of claim 29, wherein the dynamically generated HHO target set is a first, most preferred target set, and wherein the BSC further generates a second, less preferred HHO target set.

49. The BSC of claim 48, wherein the BSC uses the first and second target sets to perform an optimal resource allocation for an intra-Base Station System (BSS) HHO of the mobile station.

50. The BSC of claim 48, wherein the BSC allocates radio link resources for an intra-Base Station System (BSS) HHO of the mobile station based on the second target set if sufficient radio link resources cannot be allocated from the first target set.

51. The BSC of claim 48, wherein the first and second target sets include CDMA channels of different frequencies.

* * * * *

UNITED STATES PATENT AND TRADEMARK OFFICE
CERTIFICATE OF CORRECTION

| | | |
|---|---|---|
| PATENT NO. | : 7,583,633 B2 | Page 1 of 1 |
| APPLICATION NO. | : 10/375989 | |
| DATED | : September 1, 2009 | |
| INVENTOR(S) | : Woo et al. | |

It is certified that error appears in the above-identified patent and that said Letters Patent is hereby corrected as shown below:

In Column 15, Line 25, in Claim 14, delete "CMDA" and insert -- CDMA --, therefor.

In Column 18, Line 14, in Claim 42, delete "CMDA" and insert -- CDMA --, therefor.

In Column 18, Line 25, in Claim 44, delete "claim 29" and insert -- claim 29, --, therefor.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,583,633 B2 | Page 1 of 1 |
| APPLICATION NO. | : 10/375989 | |
| DATED | : September 1, 2009 | |
| INVENTOR(S) | : Woo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1924 days.

Signed and Sealed this

Fourteenth Day of December, 2010

David J. Kappos
*Director of the United States Patent and Trademark Office*